US012583549B2

(12) United States Patent
Marioni

(10) Patent No.: US 12,583,549 B2
(45) Date of Patent: Mar. 24, 2026

(54) ELECTRIC KICK SCOOTER WITH TILTING REAR AXLE WITH TWO WHEELS

(71) Applicant: ASKOLL EVA S.P.A., Dueville (IT)

(72) Inventor: Elio Marioni, Dueville (IT)

(73) Assignee: ASKOLL EVA S.P.A., Dueville (IT)

( * ) Notice: Subject to any disclaimer, the term of this patent is extended or adjusted under 35 U.S.C. 154(b) by 459 days.

(21) Appl. No.: 18/270,683

(22) PCT Filed: Dec. 29, 2021

(86) PCT No.: PCT/EP2021/087768
§ 371 (c)(1),
(2) Date: Jun. 30, 2023

(87) PCT Pub. No.: WO2022/144378
PCT Pub. Date: Jul. 7, 2022

(65) Prior Publication Data
US 2024/0067295 A1 Feb. 29, 2024

(30) Foreign Application Priority Data

Dec. 30, 2020 (IT) .......................... 102020000032840

(51) Int. Cl.
B62K 5/10 (2013.01)
B62K 3/00 (2006.01)
B62K 25/04 (2006.01)

(52) U.S. Cl.
CPC ................ B62K 3/002 (2013.01); B62K 5/10 (2013.01); B62K 25/04 (2013.01); B62K 2201/02 (2013.01)

(58) Field of Classification Search
CPC .......... B62K 3/002; B62K 5/10; B62K 25/04; B62K 2201/02
See application file for complete search history.

(56) References Cited

U.S. PATENT DOCUMENTS

| | | | |
|---|---|---|---|
| 12,053,689 B1* | 8/2024 | Oliphant | .............. A63C 17/015 |
| 2002/0096846 A1 | 7/2002 | Chen | |
| 2006/0071440 A1 | 4/2006 | Fought et al. | |
| 2019/0389529 A1* | 12/2019 | Lovley, II | .............. B62K 11/02 |
| 2021/0291926 A1* | 9/2021 | Newby | .................. B62K 5/027 |
| 2024/0182130 A1* | 6/2024 | Newby | .................... B62L 1/04 |

FOREIGN PATENT DOCUMENTS

| | | |
|---|---|---|
| GB | 1505224 | 3/1978 |
| KR | 20170142009 | 12/2017 |

OTHER PUBLICATIONS

International Search Report issued in PCT/EP2021/087768, Apr. 26, 2022.

* cited by examiner

*Primary Examiner* — Erick R Solis
(74) *Attorney, Agent, or Firm* — Blank Rome

(57) ABSTRACT

An electric kick scooter, of a type uncommonly stable and easy-to-handle, comprising two back wheels supported by a tilting cross member; and an intermediate support hinged to the frame through a first hinge with a first hinging axis (X) parallel to a rotation axis (Z) of the back wheels; the tilting cross member being hinged to the intermediate support through a second hinge with second hinging axis (Y) orthogonal to the rotation axis (Z) of the back wheels, the first and/or the second hinge being made as a fixed profile introduced in a hollow profile with interposition of elastic blocks.

13 Claims, 11 Drawing Sheets

ELECTRIC KICK SCOOTER WITH TILTING REAR AXLE WITH TWO WHEELS

CROSS-REFERENCE TO RELATED APPLICATIONS

This application is a national phase of PCT/EP2021/087768, filed Dec. 29, 2021, which claims priority to Italy Patent Application No. 102020000032840, filed Dec. 30, 2020, the entire contents of both of which are hereby incorporated by reference.

FIELD OF APPLICATION

The present invention refers to an electric kick scooter, that is a kick scooter provided with an electric propulsion system which can be driven by the user instead of the traditional thrust propulsion system.

The invention finds useful application in the technological sector of electric mobility.

PRIOR ART

As well known, for several years now, thanks to a greater sensitivity to environmental issues and the consequent technological improvements in the sector, there has been a wider and wider spreading of electric vehicles.

In this context, also the electric kick scooters have undergone a fast development, which electric kick scooters turned out to be perfectly adapted to the urban mobility because of their ease to be handled and usage comfort.

On the other hand, in the past, the kick scooter was relegated to the usage as toy, and accordingly, the technical solutions developed over time provided neither the usage on long distances nor the reaching of high speeds. For this reason, motorizing the vehicle now requires new product developments, aimed at ensuring the safety and usage comfort.

One of the disadvantages still to be solved in the current architecture of the electric kick scooters concerns for example the definition of the curve. The traditional construction of the kick scooter, with a front wheel connected to headset and only one back wheel in line, in fact makes the steering manoeuvre quite critical at high speeds, especially considering the mass of the vehicle which is now loaded with power supply batteries.

In addition to a possible risk of falling, the steering manoeuvre, especially with high angles, interrupts the movement fluidity of the vehicle and considerably affects the driving comfort of the same.

It can be noticed that, still in the original sector of the toy industry, specific solutions were proposed to improve the steering comfort, for example by providing a tilting rear axle with two wheels. However, said solutions, if adapted to a kick scooter project for a use on road, would imply a high construction complexity and a use comfort which is considerably affected by the high mass of the suspended parts of the rear axle.

In addition to the above-described drawback, the construction with only two wheels, which is typical of the current kick scooters, requires to be particularly careful in order to park the vehicle in an upright position, since it is necessary to extract the kickstand or lean the same vehicle to a support such as a wall or a rack. However, when the kick scooter is shared, the user often overlooks these elementary attentions, leaving the vehicle laying on the sidewalk or on the roadway, with consequent more or less serious inconveniences for the pedestrian or vehicular traffic.

Another drawback which limits the use of the electric kick scooters currently on the market, still connected to the low use comfort, is originated by the inadequacy of the suspension system and the braking system, also in this case being originated by a previous exclusively playing function.

The technical problem of the present invention is to devise a kick scooter which solves the drawbacks above reported with reference to the prior art, and which particularly guarantees a good road holding of the vehicle and an uncommon driving comfort in the definition of the curves, in the face of a structure with simple construction and maintenance.

SUMMARY OF THE INVENTION

The above-mentioned technical problem is solved by an electric kick scooter comprising: a footboard for bearing the user; a front wheel handled by a handlebar through a fork stem; two back wheels supported by a tilting cross member; an electric propulsion system provided for rotationally driving at least one of said front or back wheels; and an intermediate support hinged to the footboard through a first hinge with a first hinging axis parallel to a rotation axis of the back wheels; the tilting cross member being hinged to the intermediate support through a second hinge with second hinging axis orthogonal to the rotation axis of the back wheels; wherein at least one between said first hinge and said second hinge comprises: a housing; an inner profile inserted in said housing; and elastic return means inserted between housing and inner profile adapted to oppose an elastic return torque to any relative rotation between housing and inner profile with respect to a rest configuration.

Thanks to the above-proposed architecture, the tilting cross member can alternatively take a straight running configuration, in which the rotation axis of the wheels is parallel to the footboard, and a steering configuration, in which the rotation axis of the wheels inclines with respect to said footboard. In this way, an efficient dampening and an improvement in the steering performances of the vehicle are synergistically obtained. It can be in fact noticed that the displacement of the bodyweight of the driver determines an inclination of the footboard with respect to the back axis, and thus provides a fluid definition of the curve.

Furthermore, the presence of the three wheels guarantees a stability of the vehicle in the upright position, thus solving the above-described drawback of the indiscriminate abandoning of the shared kick scooters.

In this context, the use of at least one hinge made with an inner profile coupled inside a housing with interposed elastic return means is essential. A hinge made in this way carries out the double function of steering and dampening in a simple, economic, and efficient way. If, on the other hand, hinges of the traditional type are used, it would be simultaneously necessary to adopt springs or analogous dampening systems of the different stages of the rear axle. The resulting composite structure would be however complex and expensive to make and maintain, and it would especially cause an excessive bulk and weight, causing a total detriment of the driving comfort which the double hinging would obtain.

It can be noted that the use of hinges of the above-mentioned type reduces the maintenance operations of the vehicle, since it is not necessary to lubricate the contacting parts, turning out to be particularly advantageous especially for shared electric kick scooters.

Still the above-disclosed hinges eliminate the presence of creakings or other undesired noises and have a soft and gradual response which improves the driving comfort perception, particularly in the stage of definition of the curve.

Preferably, in the hinges of the above-described type, the housing and the inner profile both have polygonal sections, said elastic return means being elastomeric blocks inserted with interference fit between the inner edges of the polygonal section of the housing and the outer faces of the polygonal section of the inner profile. As a preferred example, a double square section is mentioned, wherein the elastomers take the form, in mounted configuration, of a triangular section and maintain the internal square offset of 45° with respect to the external square.

Preferably, both the first and second hinge which form the articulated joint of the rear axle are of the above-described type. On the other hand, the adoption even of a single hinge as above-indicated already provides, even if to a lesser degree, the different advantages above-listed due to the construction simplification of the rear axle.

Preferably, the kick scooter uses a front propulsion system, in particular a motorized hub integrated in the front wheel.

Advantageously, the second hinging axis can be oblique with respect to the footboard in the straight running configuration. In particular, it can slant downwards in the advancing direction of the electric kick scooter, preferably with an angle lower than 45°.

Preferably, the first hinging axis is at an upper level or at the same level of the rotation axis of the back wheels.

Advantageously, thanks to the above-described hinge, the tilting cross member and/or the intermediate support is made as a metal profile preferably in aluminium. The housing of the hinge can be thus integrated in the profile of said metal profile, providing a significant and clear construction simplification.

A disadvantage in the above-described structure, if the hinge with coupled profiles connects the tilting cross member to the intermediate support, is originated by the elastic characteristics of the same hinge. The interposed elastic means in fact oppose only a weak return torque in case of moderate inclinations with respect to the rest position; only in case of considerable inclinations, a significant elastic force can be obtained. However, when the kick scooter is left in parking position, the weight of the handlebar tends to laterally incline the vehicle. Since the elastic return due to the hinge is weak for small inclinations, there is a risk of an unbalancing of the vehicle which causes the falling thereof.

To overcome this drawback, a lower abutment integral with the footboard can be advantageously provided, such that the tilting cross member remains abutting on said lower abutment at least in a load-free configuration. The lower abutment, since it is integral with the frame, thus prevents the tilting cross member from swinging around the second hinge in said load-free configuration.

Advantageously, the electric kick scooter according to the present invention can provide a front dampening according to saving construction principles analogous to those applied on the back rear axle.

In particular, the front wheel can be rotatably mounted to the end of two bars elastically hinged to the free ends of a fork integral with the fork stem. The bars can be hinged on the fork through interposition of elastically deformable bushings. Furthermore, at least one elastomeric block integral with the fork can be provided, said block being deformed by one of the bars in its own angular path with respect to a rest position.

The tilting cross member can advantageously support a braking system, for example a disk brake, acting on at least one of the back wheels.

Preferably, the braking system comprises two brake levers coupled to two brake calipers acting on the two back wheels, the braking system being provided to drive both the brake calipers under operation of any one of the brake levers.

Such configuration appears particularly resilient to failures, since it always conveys the braking impulse both in case of failure of one of the brake levers, and in case of failure of one of the calipers.

The tilting cross member can also support other accessories of the rear end, such as for example a fender covering and/or a light signaller and/or a number plate. The attachment of said accessories can be advantageously made through one or more connecting plates.

Further characteristics and advantages of the present invention will result from the description, made here in the following, of a preferred embodiment example given by way of an indicative and non-limiting example with reference to the attached drawings.

DETAILED DESCRIPTION

Figures 1, 2:
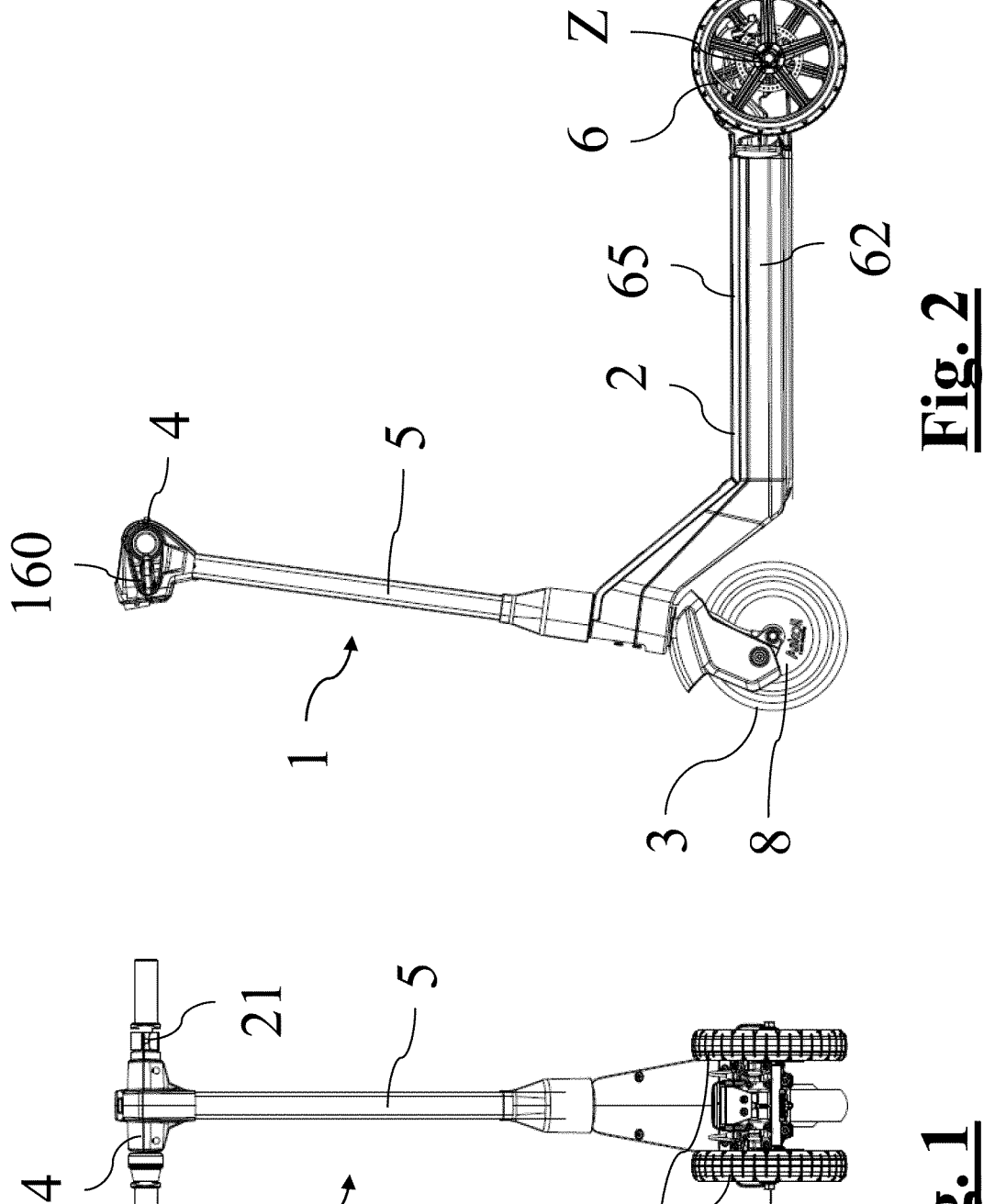
FIG. 1 shows a back view of the electric kick scooter according to the present invention.
FIG. 2 shows a lateral view of the electric kick scooter of FIG. 1.
Figures 3, 3A:
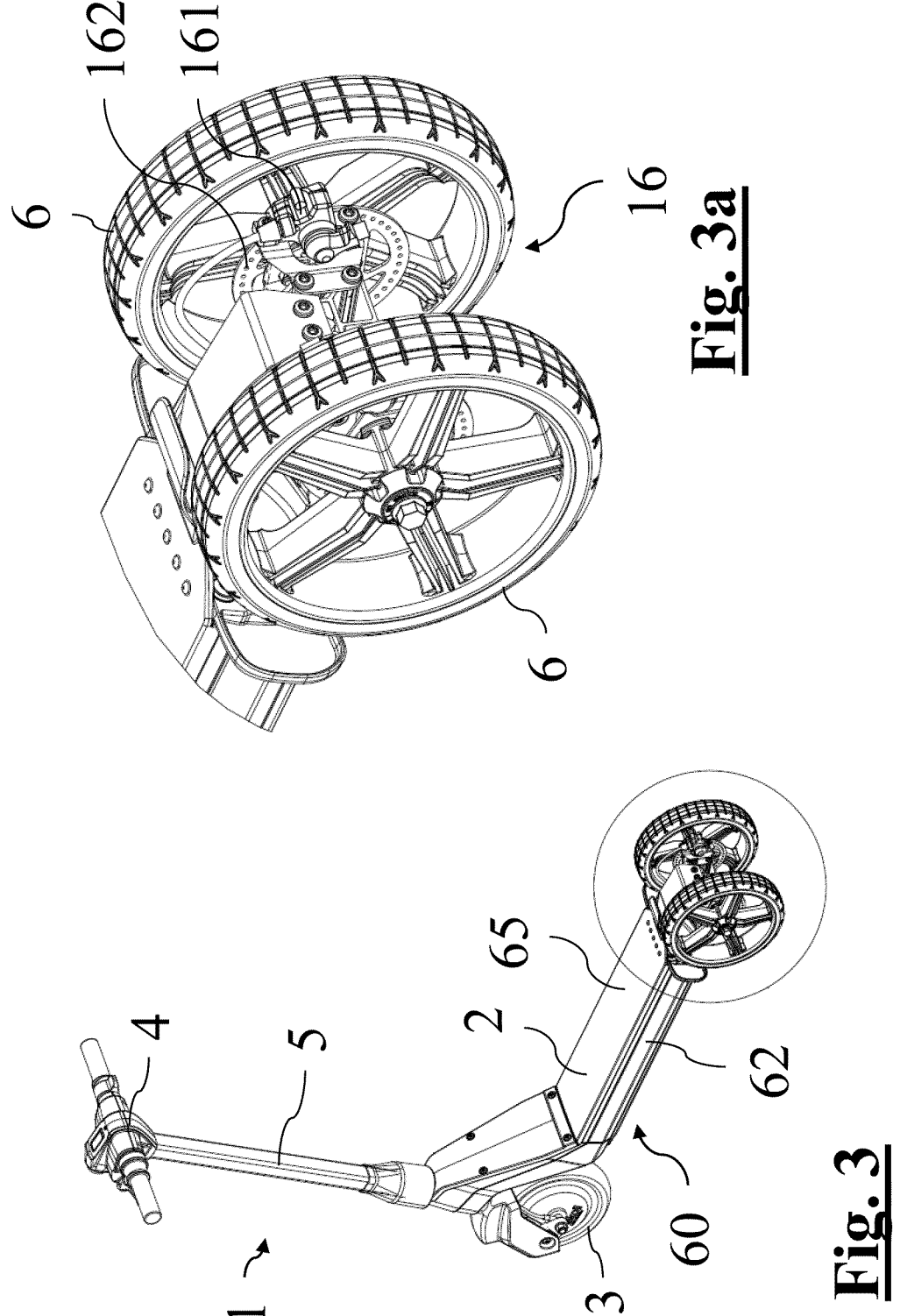
FIG. 3 shows an axonometric view of the electric kick scooter of FIG. 1.
FIG. 3*a* shows an enlarged detail, related to the braking system, of the axonometric view of FIG. 3.
Figures 4, 4A:
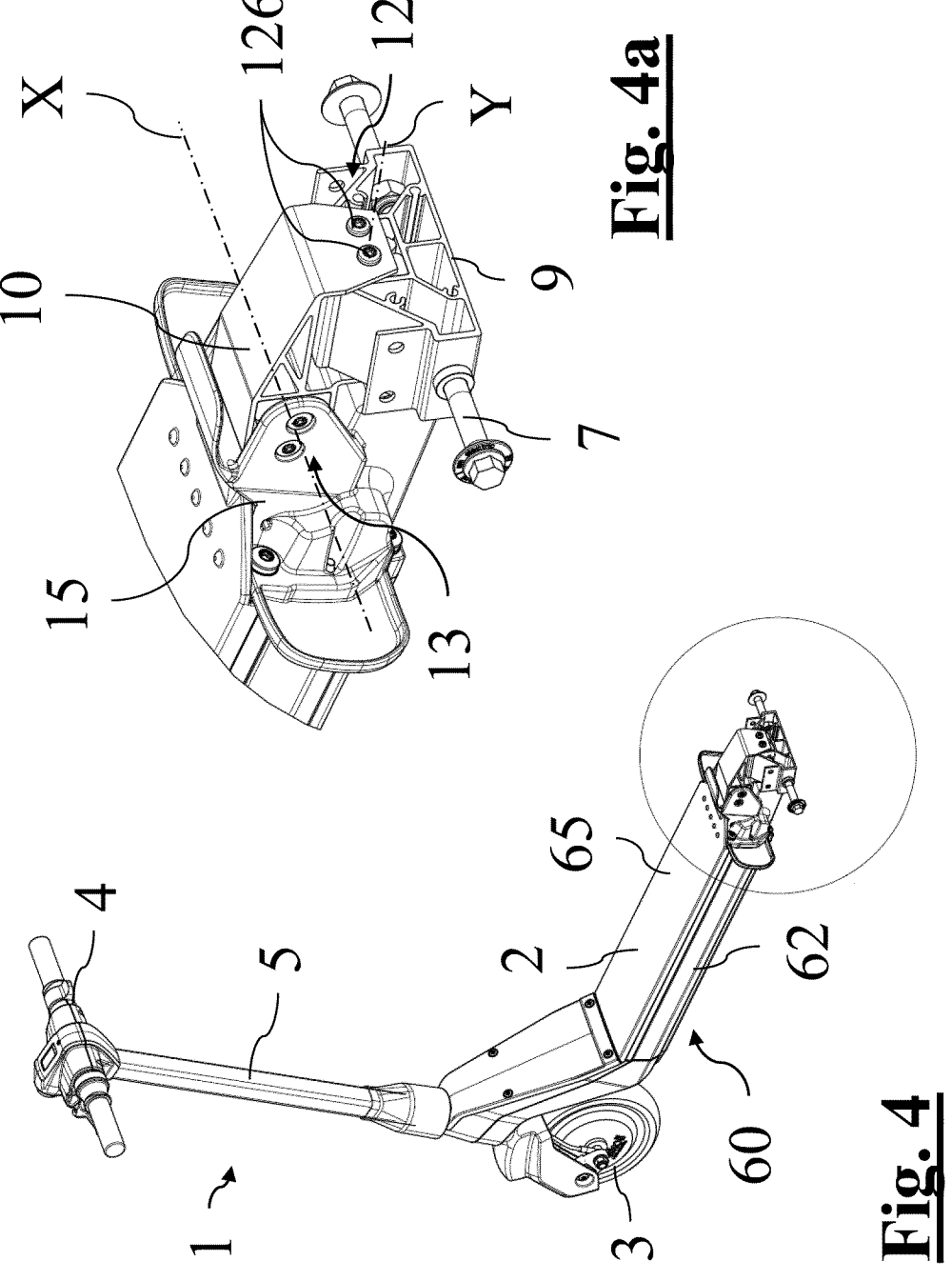
FIG. 4 shows an axonometric view of the electric kick scooter of FIG. 1, from which the back wheels and the braking system are removed.
FIG. 4*a* shows an enlarged detail, related to the rear end of the vehicle, of the axonometric view of FIG. 3.
Figure 5:
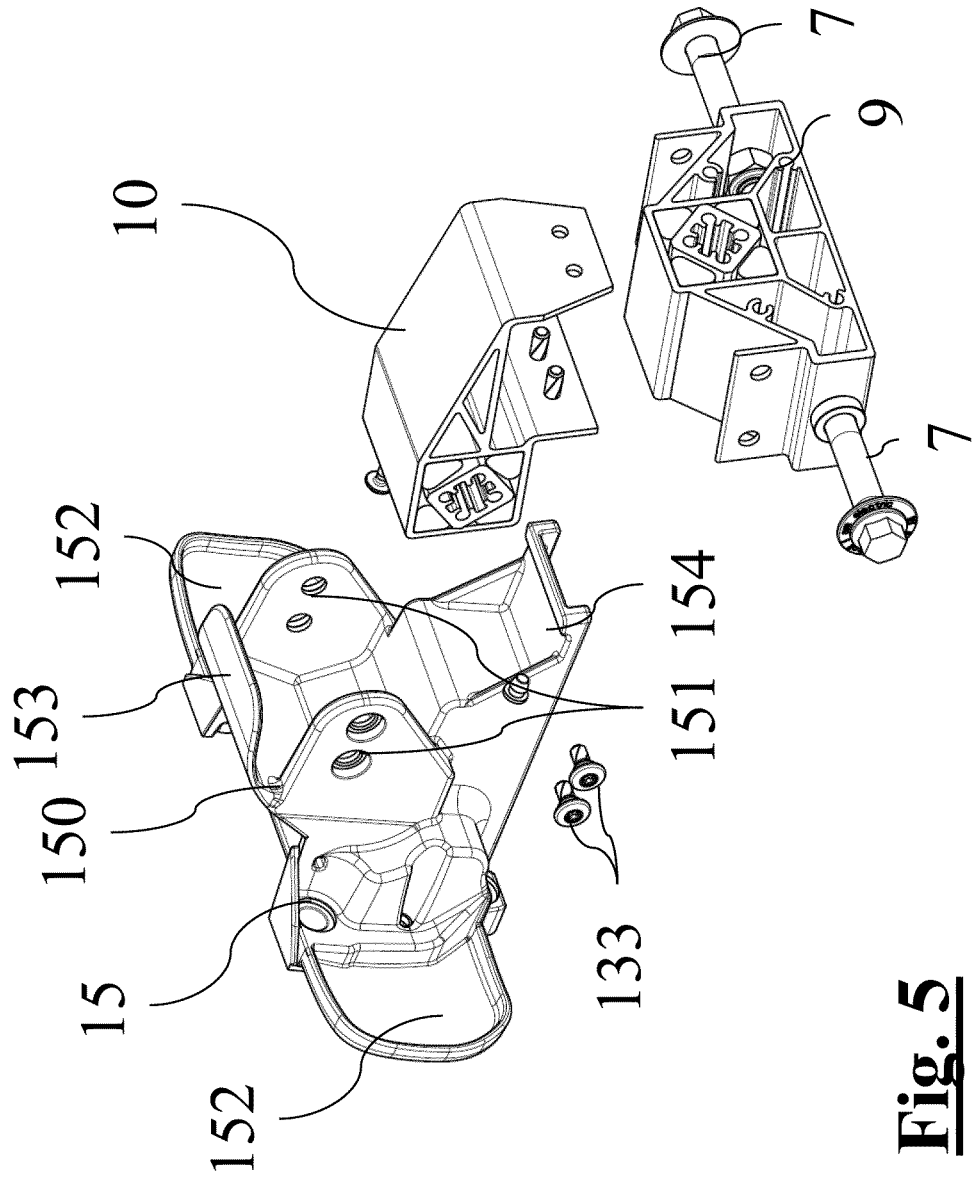
FIG. 5 shows a perspective view with exploded parts of a functional group of the kick scooter of FIG. 1, in particular the rear end.

Referring to the unit of FIG. 1, an electric kick scooter according to the present invention will be generically identified with 1.

As visible in the figure, the kick scooter 1 has a lower footboard 2 for bearing the driver's feet, a front wheel 3 handled by a handlebar 4 through a fork stem 5; and a rear end comprising two back wheels 6 placed side by side, having the same rotation axis Z.

The kick scooter 1 also comprises an electric propulsion system 8, in the form of a motorized hub, integrated in the front wheel 3. The electric propulsion system 8 is controlled by control electronics and driven by a control hand grip 21 placed on the handlebar 4, and is powered by a power supply battery contained in a compartment under the footboard 2.

In a per se known way, the control hand grip 21 allows, once the kick scooter is driven with foot thrust, to drive the electric propulsion system 8 allowing the vehicle to autonomously run.

The kick scooter 1 also comprises a back braking system 16, described in detail in the following, driven by two brake levers 160 placed at the two hand grips of the handlebar 4.

Figure 14A:
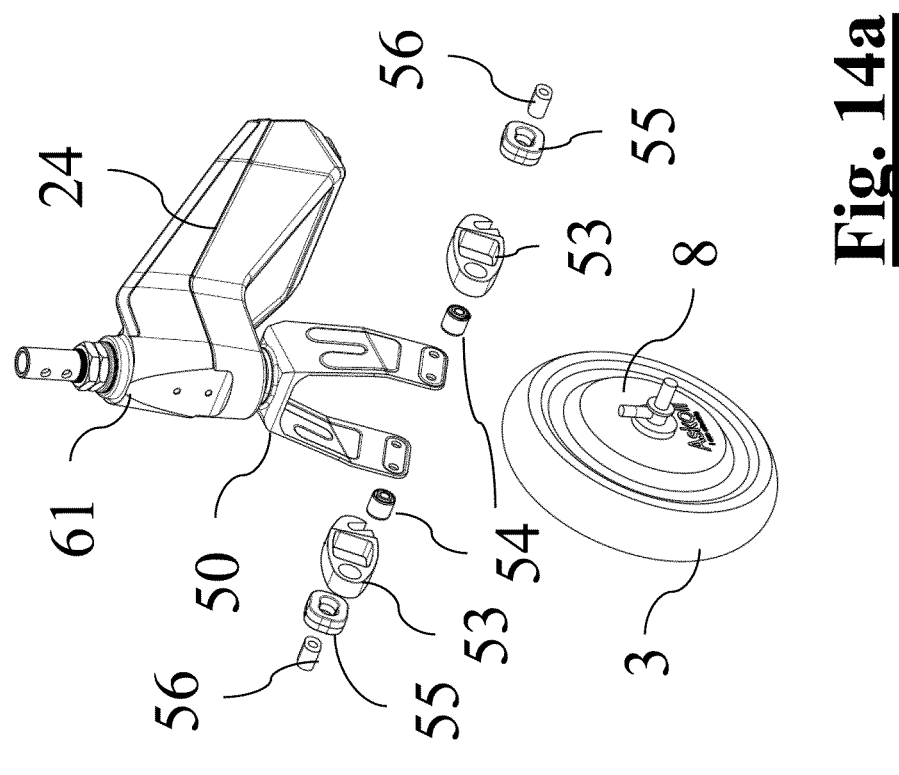
FIG. 14*a* shows a perspective view with exploded parts of the front wheel with dampening system of FIG. 14.
Figure 14:
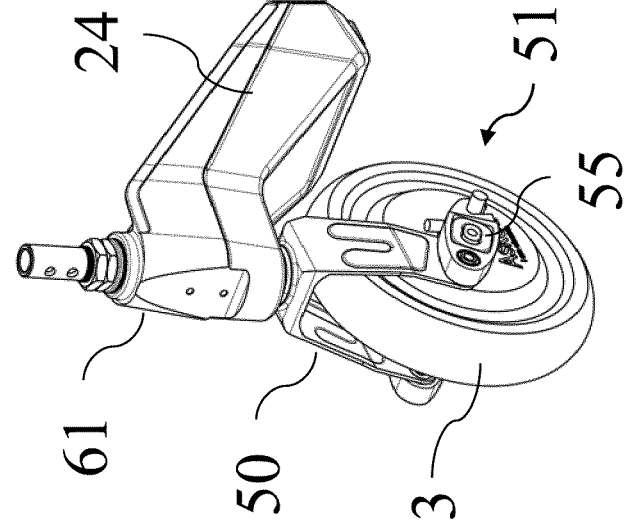
FIG. 14 shows an axonometric view of the front wheel with dampening system of the kick scooter of FIG. 1, with removed front fender.

The fork stem 5 integrally engages with the fork 50, which is clearly visible in FIGS. 14 and 14*a* and which supports the driving front wheel 3. The fork stem 5 rotatably enters a steering tube 61 which is defined at the front by a frame 60 supporting the footboard 2. Over the front wheel 3, the fork supports a front fender 52.

Front dampening means 51 are provided on the fork 50, which are visible in FIGS. 13, 13*a*, 14 and 14*a* in which the front fender 52, which covers them in the mounted configuration, is removed.

The front dampening means 51 comprise, on both the free ends of the fork 50, a bar 53 swingingly mounted to the fork 50 with interposition of an elastically deformable bushing 54 (so-called "silent block"). The free end of the two bars 53 supports the front wheel 3.

A further dampening is given by an elastomeric block 55 interposed between bar 53 and fork 50. In the preferred embodiment illustrated in the united drawings, the elastomeric block 55 is fixed around a rigid core 56, which takes the form of a sleeve projecting outwards of the respective fork arm 50. The elastomeric block 55 enters an intermediate window of the bar 53, which deforms it during the angular path thereof receiving an elastic return towards a neutral position.

The bar 53 has an angular path a from the neutral position to the totally deformed one. The angular path a corresponds to a lowering K of the vehicle, which is approximately comprised between 10 mm and 20 mm, preferably equal to 15 mm.

The control electronics, not represented in the united figures, preferably comprises an inverter controller. It is contained in a boxed portion 24 placed in a front crank of the frame 60, and interconnects with the adjacent power supply battery, which is also not represented.

The frame 60 comprises a preferably metal cradle 62 which is connected at the front to the aforementioned steering tube 61, which is also metallic. The cradle 62 defines the housing compartment of the power supply battery 24 therein. The footboard 2 is placed above a lid 65 of the compartment, provided with stepping covering and hinged to the frame 60. Advantageously, the lid 65 can be blocked in closing position by means of a key introduced in a designated lock.

At the back, a shoe 15, which represents the attachment point for the whole rear end, is attached to the cradle 62 of the frame 60. In the present embodiment, the shoe 15 is configured as an attachment plate, coupled through screws to the back end of the cradle 62. The two lateral ends of the shoe 15 extend in tongues 152, with protection function of the bead, as well as of fenders.

At the back of the shoe 15, an attachment body 150 develops which defines two attachment lateral appendixes 151, as well as an upper protection 153, which is aimed to prevent the insertion of foreign objects in the hinge articulated joint, and a lower abutment 154, which function is further described in the following.

Figures 6, 6A:
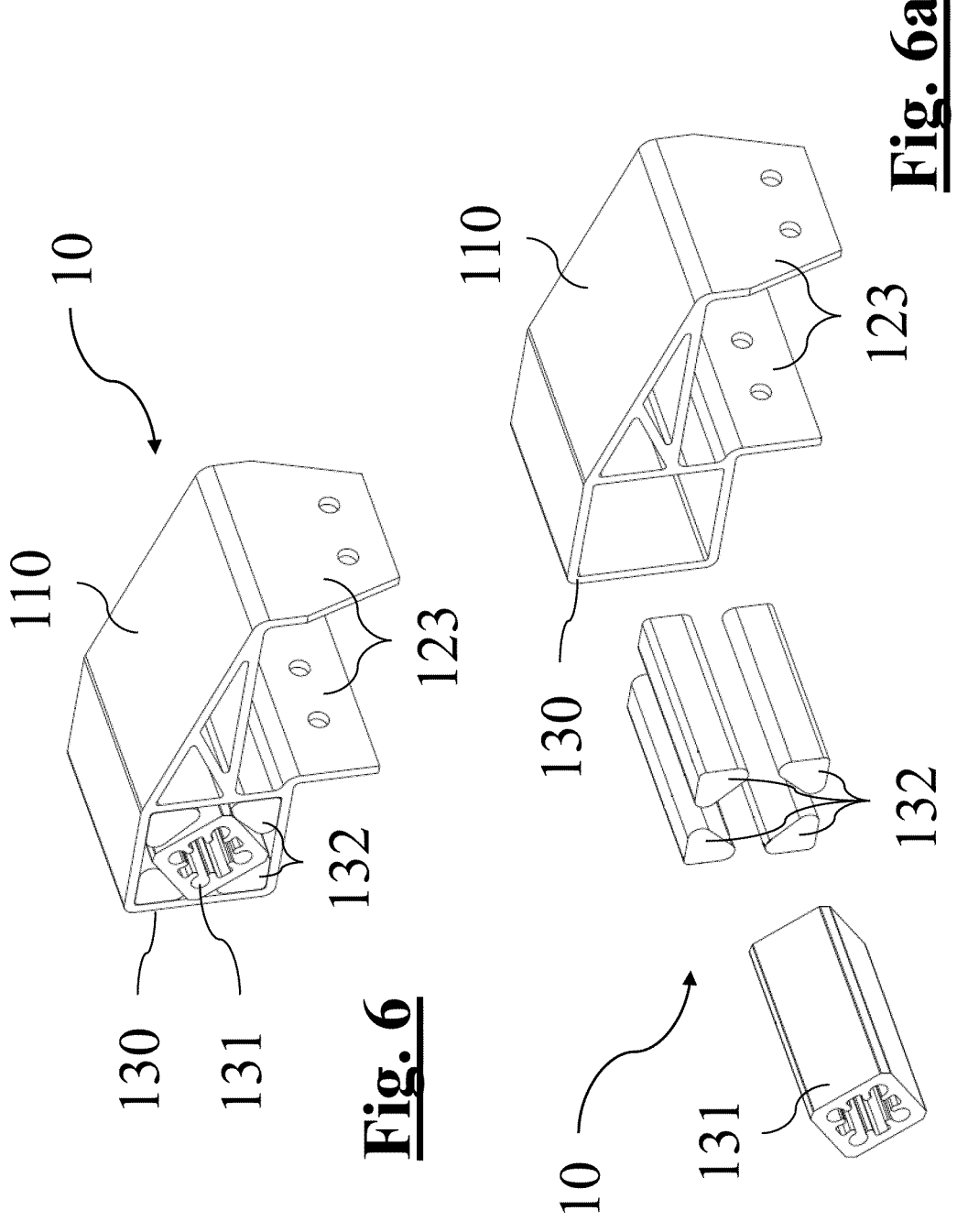
FIG. 6 shows a single assembly of the rear end of FIG. 5, in particular the intermediate support.
FIG. 6*a* shows a perspective with exploded parts of the intermediate support of FIG. 6.

An intermediate support 10, which is singularly illustrated in FIGS. 6 and 6*a*, is hinged on the shoe 15, according to ways described in the following.

The intermediate support 10 takes the form of a crank profile, preferably in aluminium. The intermediate support 10 has a housing 130 with square section, connected by a right-angled loop 110 to two front and back attachment appendixes 123.

An inner profile 131, also with square section, which connects the two lateral appendixes 151, enters the housing 130. In particular, the inner profile 131 is integrally attached to said attachment appendixes 151 through coupling screws 133, two for each part. The square outline of the inner profile 131, in a rest configuration, is rotated of 45° with respect to square outline of the housing 130. Four elastomeric blocks 132 are furthermore introduced, with interference fit, between the two elements, which elastomeric blocks abut onto the inner edges of the housing 130 and onto the lateral faces of the inner profile 131. Also in this case, the elastomeric blocks 132, with preferably cylindrical profile, take the form, in mounted configuration, of a triangular profile. Such triangular profile is maintained, for representative coherence, also in the explosion of FIG. 7*a*; however, it is clear that, in reality, the elastomeric blocks 132 extracted from the seat thereof would retake the initial cylindrical profile thereof. The elastomeric blocks 132 maintain the two elements in the above-discussed rest configuration and define an elastic return torque towards said configuration in case of relative rotation between housing 130 and inner profile 131.

The group consisting of housing 130, inner profile 131 and elastomeric blocks 132 thus defines a first hinge 13 around a first hinging axis X substantially horizontal and perpendicular to the advancing direction of the kick scooter 1. The first hinging axis X is parallel to the rotation axis Z of the back wheels 6, but is placed at the front and at a higher height.

This first hinge 13 integrates the elastic return means thereinside which damp the angular path of the whole rear end of the kick scooter 1 associated to the shoe 15.

The angular path 13 of the first hinge 13 is approximately comprised between 10° and 30°, preferably equal to 20°. A lowering L of the vehicle, approximately comprised between 10 mm and 30 mm, preferably equal to 20 mm, corresponds to the angular path β. Also, when the rear end is in upper stop position, the first hinging axis X remains at a higher height with respect to the rotation axis Z of the back wheels 6.

Figures 7, 7A:
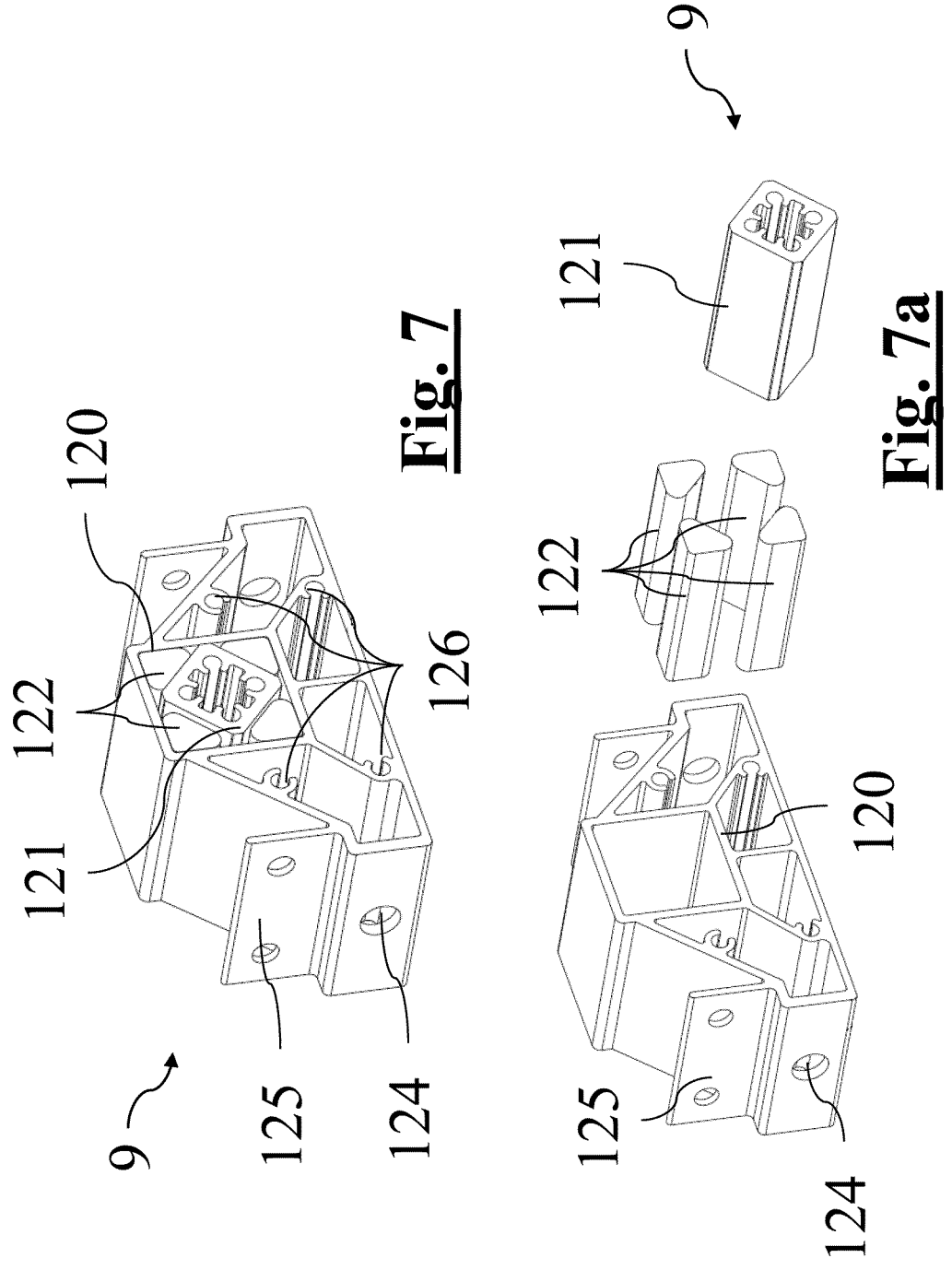
FIG. 7 shows a single assembly of the rear end of FIG. 5, in particular the tilting cross member.
FIG. 7*a* shows a perspective view with exploded parts of the tilting cross member of FIG. 7.

A tilting cross member 9, singularly illustrated in FIGS. 7 and 7a, which rotatably supports the back wheels, is swingingly mounted to the intermediate support 10.

The tilting cross member 9 takes the form of a profile, preferably in aluminium, which profile is substantially in form of isosceles trapezoid. At the top of the trapezoid, at the smaller base, a housing 120 with square base analogous to the housing 130 of the intermediate support 10 is obtained.

Through holes 124, which accommodate the same amount of support pins 7, are instead at the sides of the greater base of the trapezoid. The two back wheels 6 are idly mounted on the support pins 7. The back wheels 6 preferably have a plastic body coated with injected polyurethane to define the tread.

It can be noted that, instead of the use of two fixed and separate support pins 7, it is clearly possible the use of a rotatable axis which supports both the back wheels 6.

Above the two through holes 124, the intermediate support 10 comprises the same number of connecting flanges 125. The connecting flanges 125 allow a fender covering above it to be integrally fixed, the fender being possibly provided with back light signaller and not illustrated in the figures.

The tilting cross member 9 also has, on the inner profile thereof, attachments 126 for attachment screws of brake calipers 161 of the braking system 16.

An inner profile 121, also with a square section, which connects the two attachment appendixes 123 of the intermediate support 10, enters the above-mentioned housing 120 with square base of the tilting cross member 9. The inner profile 121 is integrally attached to said attachment appendixes 123 through coupling screws 126, two for each part. The square outline of the inner profile 121, in a rest configuration, is rotated of 45° with respect to the square outline of the housing 120. Four elastomeric blocks 122, which abut onto the inner edges of the housing 120 and onto the lateral faces of the inner profile 121 are introduced, with interference fit, between the two elements. The elastomeric blocks have a profile with preferably circular section when they are not compressed, but, when they are in position, they take the form of a triangular profile. Such triangular profile is maintained for representative coherence also in the explosion of FIG. 6a; however, it is clear that, in reality, the elastomeric blocks 122 extracted from the seat thereof would retake the initial cylindrical profile thereof. The elastomeric blocks 122 maintain the two elements in the above-discussed rest configuration, and define an elastic return torque towards said configuration in case of relative rotation between housing 120 and inner profile 121.

The group consisting of housing 120, inner profile 121 and elastomeric blocks 122 thus defines a second dampened hinge 12, which is completely analogous to the previously-described first hinge 13. The second hinge 12 is rotatable around a second hinging axis Y orthogonal to the first, laying on the middle plane of the kick scooter 1 and slanted downwards towards the front direction.

The second hinge 12 allows a hunting of the kick scooter with respect to the front wheels thereof. The maximum angular path δ with respect to the vertical is approximately comprised between 20° and 40°, preferably equal to 30°.

The back wheels 6 are then double-hinged to the frame 60 of the footboard 2: along a first horizontal hinging axis X and along a second oblique hinging axis Y. Both the movements are dampened by the elastic elements integrated inside the first hinge 13 and the second hinge 12.

It can be noted that the elastic return torque of the above-described hinges 12, 13 is quite weak for moderate rotations with respect to the rest configuration. For this reason, maintaining the upright position of the handlebar in parking conditions cannot be demanded only to the elastic means of the second hinge 12.

Figures 8, 9:
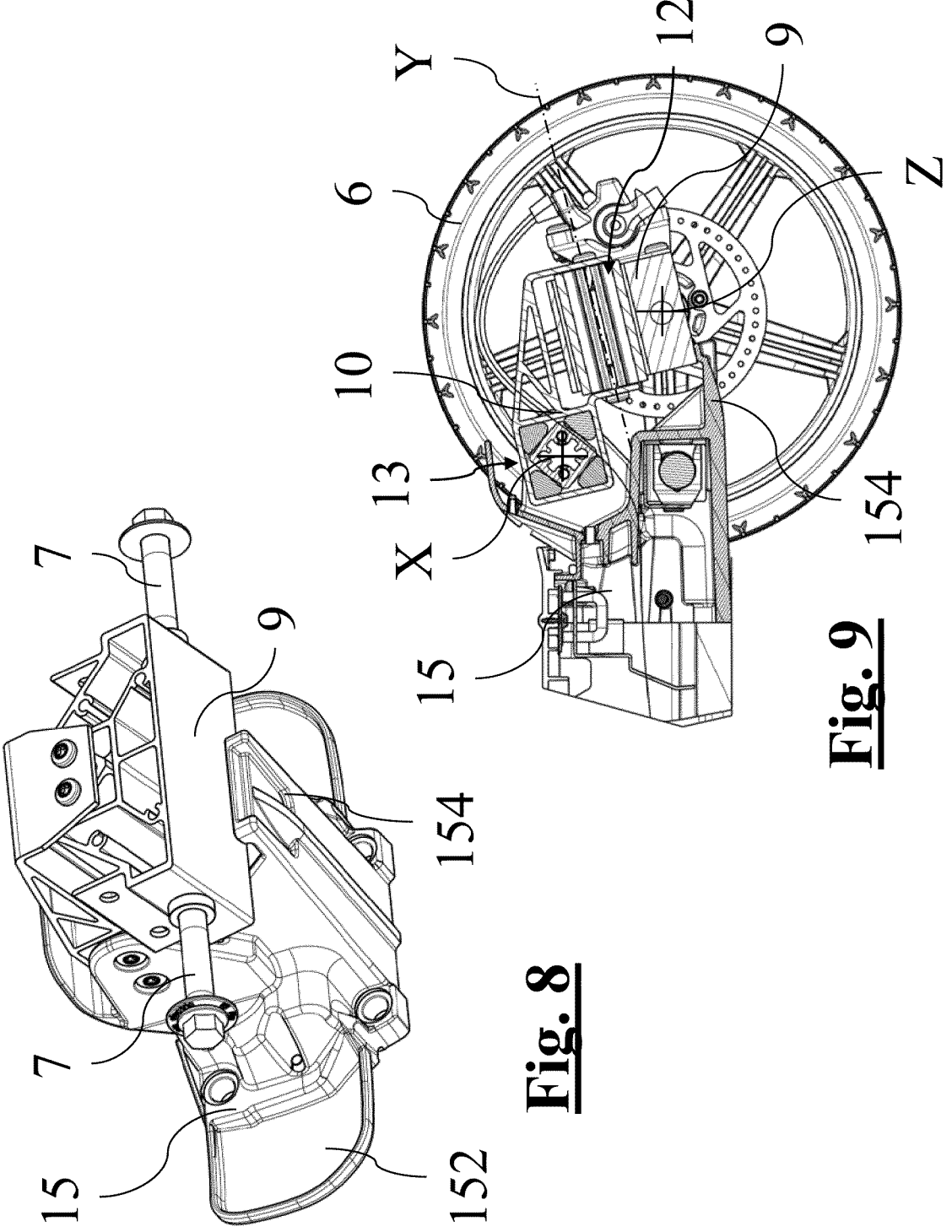
FIG. 8 shows an axonometric view according to a lower observation point of the rear end of the kick scooter of FIG. 1.
FIG. 9 shows a lateral view, sectioned according to a median plane of the vehicle, of the rear end of the kick scooter of FIG. 1.
Figures 10, 11:
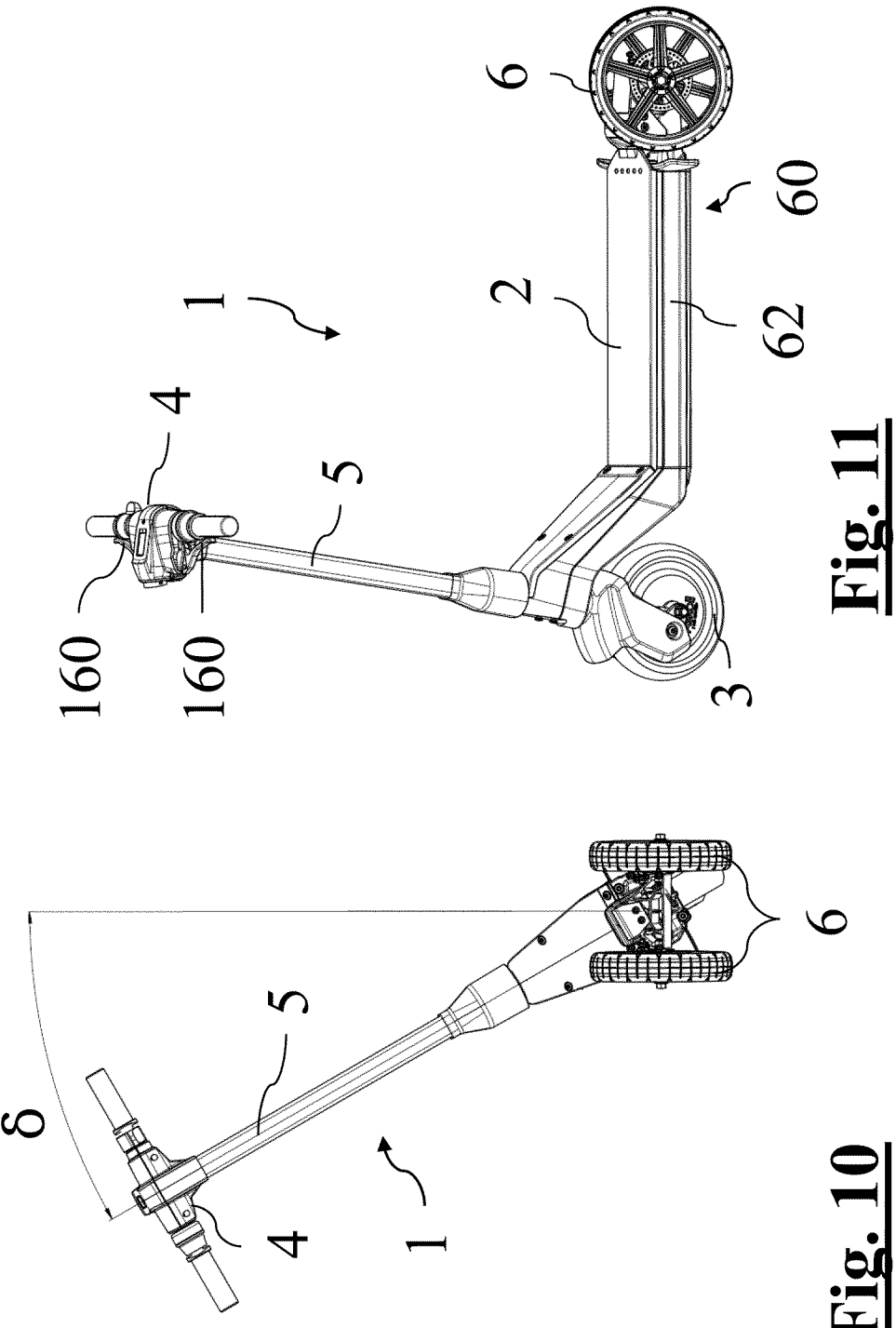
FIG. 10 shows a back view of the electric kick scooter of FIG. 1 in a steering configuration.
FIG. 11 shows an axonometric view of the electric kick scooter of FIG. 1 in a steering configuration.
Figures 12, 12A:
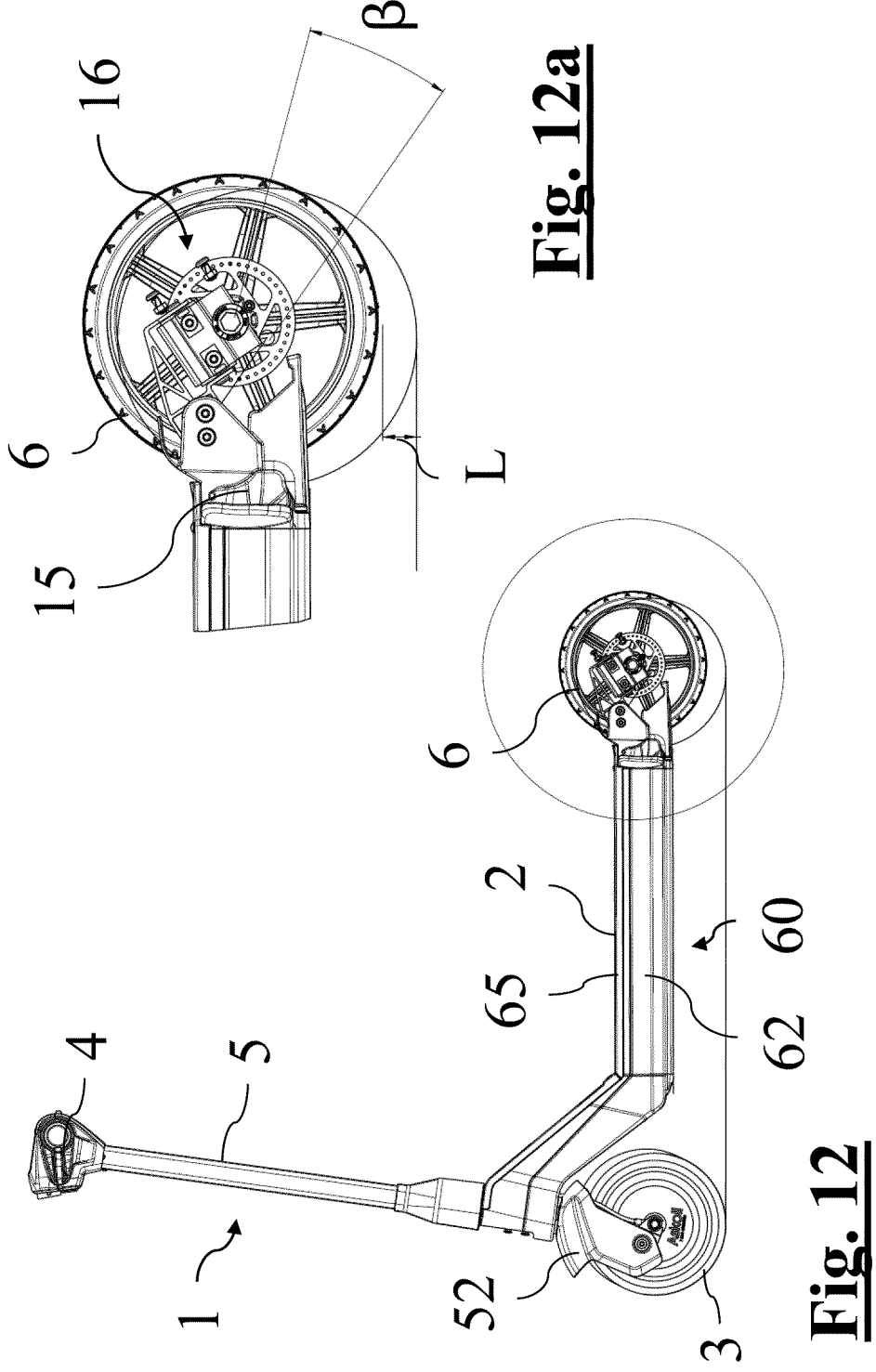
FIG. 12 shows a lateral view of the electric kick scooter of FIG. 1 in a configuration of maximum angular path of the back dampening system.
FIG. 12*a* shows an enlarged detail, related to the back rear axle, of the lateral view of FIG. 12.
Figures 13, 13A:
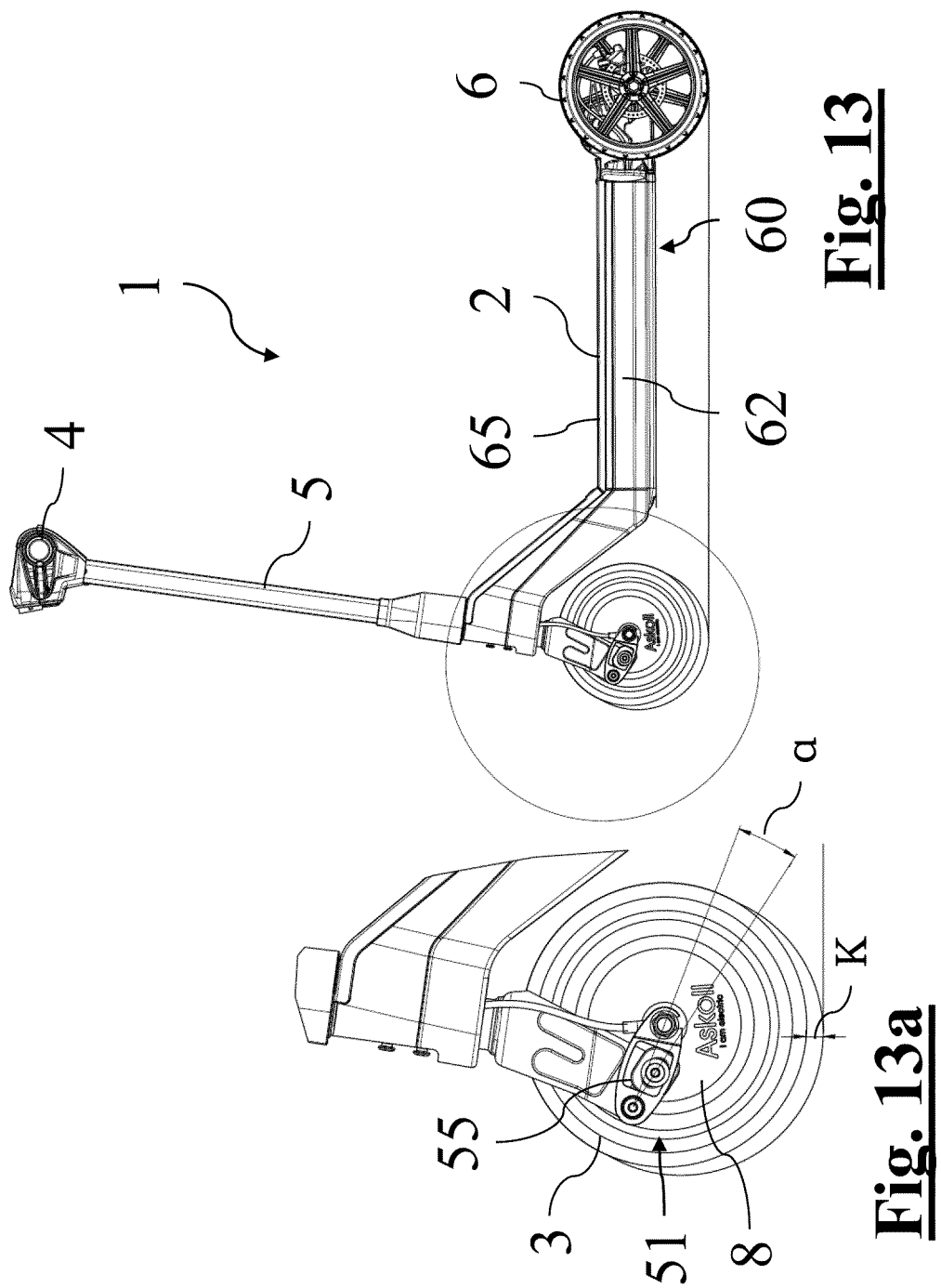
FIG. 13 shows a lateral view of the electric kick scooter of FIG. 1 in a configuration of maximum angular path of the front dampening system, with removed front fender.
FIG. 13*a* shows an enlarged detail, related to the front wheel and the dampening system thereof, of the lateral view of FIG. 13.

The lower abutment 154 of the intermediate support 10, previously described, serves to this purpose. When the first hinge 13 is in rest configuration, the lower surface of the tilting cross member 9 abuts against the lower abutment 154, as shown in FIG. 8. In load-free conditions, that is when the user leaves the kick scooter parked, the first hinge 13 is no more under operation and goes back to the above-mentioned rest configuration. The tilting cross member 9 thus abuts against the lower abutment 154 which prevents it from laterally swinging, guaranteeing a stable parking position in which the fork stem 5 remains upright.

The braking system 16, comprising two brake calipers 161 with respective disks 162 on each of the back wheels 6, is finally associated to the rear end.

The brake calipers 161 are coupled to the two brake levers 160 on the handlebar 4 through a controller/splitter system: the signal of the two levers 160 is in fact firstly combined, then distributed on both the back brake calipers 161. The braking system is resilient to the failures since, where the transmission between one of the brake levers 160 and the controller/splitter is interrupted and/or the transmission between the controller/splitter and one of the brake calipers 161 is interrupted, a satisfying operation is anyway maintained.

The double hinging of the back axis, as it results from the previous description, allows achieving the purposes of the invention improving the use comfort of the vehicle. In particular, in the definition of the curve, the driver can follow the manoeuvre by displacing the weight of the body on the footboard, thus obtaining the inclination of the back axis which determines or eases the steering.

The use of the above-described hinges further allows a considerable construction simplification, thus providing a high torsion angle with a single element.

The hinges are furthermore advantageous since they do not require any operating maintenance; it is in fact not necessary the periodic lubrication of the contacting elements without friction constraints. For the same reason, the kick scooter has the further advantage that it is particularly quiet while curving.

It can be also observed that, given the above-described construction configuration, the masses of the suspended rear axle can be maintained quite reduced. In this way, a high driving comfort is achieved, since the slender rear axle is able to accurately follow the roughness of the ground on which the electric vehicle moves.

It can be noted that the above-described kick scooter is advantageously stable in the parking position thereof, in virtue of the double back wheel and of the lower abutment which blocks the lateral swingings when there is no load. For this reason, the kick scooter appears to be particularly recommended for sharing services, since there is no risk of indiscriminate abandoning in laying position with consequent inconveniences to the other street user.

Obviously, a skilled person in the art, in order to meet contingent and specific needs, may make to the above-mentioned kick scooter various changes and variations, all moreover included in the scope of protection of the invention as defined by the following claims.

What is claimed is:

1. An electric kick scooter comprising: a footboard for bearing a user; a front wheel handled by a handlebar through a fork stem; two back wheels supported by a tilting cross member; an electric propulsion system provided for rotationally driving at least one of said front wheel or said back wheels; and an intermediate support hinged to the footboard through a first hinge with a first hinging axis parallel to a rotation axis of the back wheels; the tilting cross member being hinged to the intermediate support through a second hinge with a second hinging axis orthogonal to the rotation axis of the back wheels; wherein at least one between said first hinge and said second hinge comprises: a housing; an inner profile inserted in said housing; and elastic return means inserted between said housing and said inner profile adapted to oppose an elastic return torque to any relative rotation between housing and inner profile with respect to a rest configuration.

2. The electric kick scooter according to claim 1, wherein said housing and said inner profile both have a polygonal section, said elastic return means being elastomeric blocks inserted with an interference fit between the inner edges of the polygonal section of the housing and outer faces of the polygonal section of the inner profile.

3. The electric kick scooter according to claim 1, wherein both the first hinge and the second hinge comprise a respective housing; a respective inner profile inserted in said housing and elastic return means inserted between the housing and the internal profile adapted to oppose an elastic return torque to any relative rotation between the housing and the inner profile with respect to a rest configuration.

4. The electric kick scooter according claim 1, wherein said second hinging axis is oblique with respect to a plane defined by the footboard in a straight running configuration.

5. The electric kick scooter according to claim 4, wherein said second hinging axis slants downwards in the advancing direction of the electric kick scooter.

6. The electric kick scooter according to claim 1, wherein said first hinging axis is at an upper level or at a same level of the rotation axis of the back wheels.

7. The electric kick scooter according to claim 1, wherein the tilting cross member and/or the intermediate mount are made as a metal profile, the housing of the first hinge and/or the housing of the second hinge being integrated in the profile of said metal profile.

8. The electric kick scooter according to claim 1, further comprising at least one lower abutment integral with said footboard, said tilting cross member abutting on said lower abutment at least in a load-free configuration, said lower abutment preventing the tilting cross member from swinging around the second hinge in said load-free configuration.

9. The electric kick scooter according to claim 1, wherein said front wheel is rotatably mounted to ends of two bars elastically hinged to free ends of a fork integral with the fork stem.

10. The electric kick scooter according to claim 9, wherein said bars are hinged on the fork through interposition of elastically deformable bushings.

11. The electric kick scooter according to claim 9, further comprising at least one elastomeric block integral with the fork and deformed by one of the bars in its own angular path with respect to a rest position.

12. The electric kick scooter according to claim 1, wherein said tilting cross member supports a braking system acting on at least one of the back wheels.

13. The electric kick scooter according to claim 12, wherein the braking system comprises two brake levers coupled with two brake calipers acting on the two back wheels, the braking system being provided to drive both brake calipers under operation of any one of the brake levers.

* * * * *